United States Patent [19]

Huang

[11] Patent Number: 4,984,555
[45] Date of Patent: Jan. 15, 1991

[54] DIESEL ENGINE FUEL PIPELINE HEATING DEVICE

[76] Inventor: Kuo-Liang Huang, 2fl. No. 27 Line 51 Hsin Tung St., Taipei, Taiwan

[21] Appl. No.: 380,815

[22] Filed: Jul. 14, 1989

[51] Int. Cl.⁵ .......................................... F02M 31/00
[52] U.S. Cl. .................................. 123/545; 123/549; 123/557
[58] Field of Search ................ 123/557, 549, 547, 545

[56] References Cited

U.S. PATENT DOCUMENTS

| | | | |
|---|---|---|---|
| 4,180,036 | 12/1979 | Wolf | 123/557 |
| 4,259,937 | 4/1981 | Elliott | 123/557 |
| 4,351,301 | 9/1982 | Allen | 123/557 |
| 4,432,329 | 2/1984 | Redele | 123/557 |
| 4,519,358 | 5/1985 | Redele | 123/557 |
| 4,527,533 | 7/1985 | Laramee | 123/557 |
| 4,748,960 | 6/1988 | Wolf | 123/557 |
| 4,790,285 | 12/1988 | Wolf | 123/557 |
| 4,818,842 | 4/1989 | Walty | 123/557 |

Primary Examiner—Andrew M. Dolinar
Assistant Examiner—M. Macy
Attorney, Agent, or Firm—Brooks Haidt Haffner & Delahunty

[57] ABSTRACT

The present invention is related to a diesel engine fuel pipeline heating device and particularly to a diesel engine fuel pipeline heating device consisting of an electric heating device and a water (or air) temperature heating device provided to the exterior of diesel engine fuel pipe. A diesel engine equipped with such a heating device can be easily started through the electric heating device to heat the fuel in the fuel pipe up to a suitable starting temperature around 40° C. (or 104° F.) before starting the engine; and after starting the engine for some time, namely, when the temperature in the heating cylinder of water (or air) heating device has risen to the said suitable combustion temperature around 40° C. (or 104° F.), the power source of electric heating device is automatically turned off to stop the heating action. Then the hot water from the water return pipe of radiator or the hot air from the exhaust pipeline of exhaust pipe keeps continued preheating of fuel pipe for a constant temperature through the water (or air) heating device so as to continuously keep the full fuel combustion, easily and smoothyl start and run the engine, save fuel and enhance the horse power of engine.

5 Claims, 1 Drawing Sheet

DIESEL ENGINE FUEL PIPELINE HEATING DEVICE

BACKGROUND OF THE INVENTION

1. Field of the Invention

The present invention is related to a diesel engine fuel pipeline heating device and particularly to a heating device provided to the diesel engine fuel pipe so as to heat fuel pipe, promote full fuel combustion (explosion), start and run the engine easily and smoothly, save fuel, and enhance the horse power of the engine.

2. Description of the Prior Art

Conventional vehicles or machine tools have never been equipped with a fuel heating device, so when starting the diesel engine in the cold winter or in the countries and regions in the frigid zone such as those north of the United States in North America, north of England and Germany in Europe, and north of Japan in Asia, it is extremely difficult to start the diesel engine or it tends to run unsmoothly after starting. Some manufacturers have tried to install a heating device in the fuel tank; However, the volume of the fuel tank in general is rather large, so that heating the fuel as a whole in such a large fuel tank to a suitable combustion (explosion) temperature (approximate 40° C., namely, 104° F.) takes substantial heating time and consumes a significant amount of electric power and is uneconomical.

Applicant has found that there is the foregoing trouble of starting the diesel engine in frigid zones and therefore invented a diesel engine fuel pipeline heating device.

SUMMARY OF THE INVENTION

The diesel engine fuel pipeling heating device in accordance with the present invention consists of an electric heating device and a water (or air) temperature heating device provided to the exterior of diesel engine fuel pipe. The diesel engine equipped with the present invention can make the temperature of fuel in the fuel pipe rise to a suitable temperature for starting (approximate 40° C., i.e. 104° F.) through the heating of an electric heating device before starting the engine, so it is easy to start, and then the hot water from the water return pipe of the radiator or the hot air from the exhaust pipe keeps continued preheating of the fuel pipe for a constant temperature through the water (or air) temperature heating device so as to continuously maintain full fuel combustion (explosion). Therefore, the invention makes it easy to start and run the engine smoothly, and can save fuel and enhance the horse power of said engine.

DETAILED DESCRIPTION OF THE PREFERRED EMBODIMENT

Figure 1:
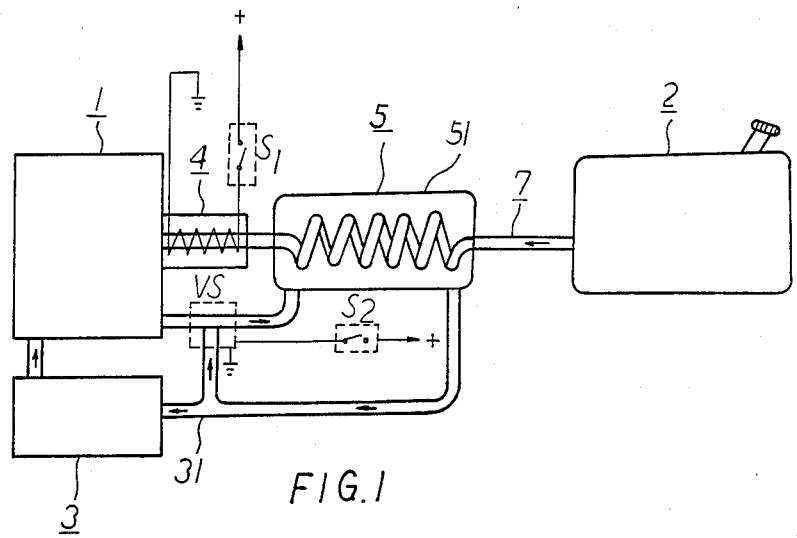
FIG. 1 is a schematic view of a water temperature heating device in accordance with the present invention.
Figure 2:
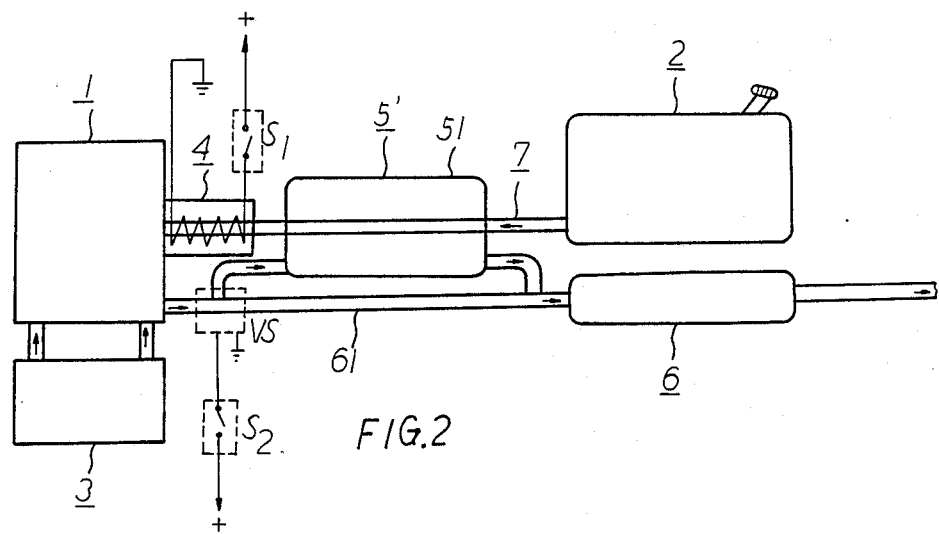
FIG. 2 is a schematic view of an air temperature heating device in accordance with the present invention.

As shown in FIGS. 1 and 2, the present invention consists chiefly of an electric heating device 4 provided to the exterior of fuel pipe 7 nearby the engine 1 and between the engine 1 and the fuel tank 2, and a water (or air) heating device 5 (or 5′) (as shown in FIG. 1 and 2 respectively) provided to the exterior of fuel pipe 7 behind the electric heating device 4. The electric heating device 4 is an electric heating wire or an electric heating piece or an electric heating pipe of which the inner and outer surfaces are covered with an insulating, chillproof and heatproof material, and an automatic constant temperature (desirably set at 40° C., i.e. 140° F. in general) control switch $S_1$ is provided to the electric heating device 4. Before starting the engine 1, the constant temperature control switch $S_1$ may be turned on so that the electric heating wire (or piece or pipe) of electric heating device 4 is powered to heat up the fuel in the fuel pipe 7 to about 40° C. (104° F.) and the engine 1 can be easily started. In the meantime, after starting the engine 1 for some time (about 2-3 minutes), when the temperature of water (or air) heating device 5 (or 5′) reaches the suitable combustion (explosion) temperature 40° C. (or 104° F.), the power source of electric heating wire (or piece or pipe) can be automatically turned off to stop heating.

Figure 3:
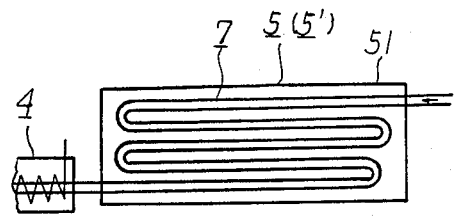
FIG. 3 is a schematic view of another example of a water (or air) temperature heating device in accordance with the present invention.

The portion of fuel pipe 7 of diesel engine 1, which is provided with the water (or air) heating device 5 (or 5′), may be spiral (as shown in FIG. 1) or zigzag (as shown in FIG. 3) or straight (as shown in FIG. 2).

A closed heating cylinder 51 is provided on the exterior of the portion of fuel pipe 7 and connected in parallel to the water return pipe 31 of the radiator 3 (as shown in FIG. 1) or the exhaust pipeline 61 of exhaust pipe 6 (as shown in FIG. 2). A self closing value VS with a constant temperature switch $S_2$ is provided to the connection thereof to control the opening and closing actions thereof at the constant temperature (namely, set at 40° C. or 104° F. in general) so that when the temperature in the closed heating cylinder 51 is below the set constant temperature 40° C. or 104° F., the self closing valve VS remains open to let the hot water in the water return pipe 31 or the hot air in exhaust pipeline 61 flow through the closed heating cylinder 51; and when the temperature in the heating cylinder 51 is above the set constant temperature, the self closing valve VS is automatically closed through the control of the constant temperature control switch $S_2$ so as to stop the hot water or hot air flowing into the closed heating cylinder 51 and to cease heating the fuel pipe 7. Through such repeated automatic action, after starting the engine 1, the temperature the input fuel from the fuel pipe 7 can be kept around the set temperature 40° C. or 104° F. so that the engine 1 can continuously receive the fuel at a suitable combustion (explosion) temperature, run smoothly. The engine is also prevented from stopping ignition or installing and the horse power of the engine is enhanced and fuel consumption is reduced (i.e. fuel saved).

In view of the above, a diesel engine equipped with the heating device of the present invention can be easily started by using the electric heating device 4 to heat the fuel in the fuel pipe 7 up to a suitable combustion (explosion) temperature around 40° C. or 104° F. before starting the engine 1; and after starting the engine 1 for some time, namely, when the temperature in the heating cylinder 51 of water (or air) temperature heating device 5 (or 5′) has risen to said suitable combustion (explosion) temperature around 40° C., the power source of the electric heating device 4 can be automatically turned off to stop the heating action: and then the hot water from the water return pipe 31 of radiator 3 or the hot air from the exhaust pipeline 61 of exhaust pipe 6 continue preheating the fuel pipe to a constant temperature through the water (or air) temperature heating device 5 (or 5') so as to continuously maintain full fuel combustion (explosion). Therefore, the invention makes it easy to start and the run the engine 1 smoothly, and can save fuel and enhance the horse power of the engine 1.

What is claimed is:

1. A diesel engine fuel pipeline heating device comprising:
    an electric heating device provided on the exterior of the portion of the fuel pipeline proximate to the engine;
    a fluid heating device heating device provided on the exterior of the fuel pipeline between said electric heating device and a fuel tank which supplies diesel fuel to the engine;
    a valve for selectively feeding and diverting heated fluid through said fluid heating device heating device; and
    a constant temperature switch for monitoring the temperature of the fluid passing through said fluid heating device heating device and causing the heated fluid to pass through said fluid heating device heating device only when the fluid temperature is a predetermined temperature and diverting the heated fluid at lower temperatures, whereby the diesel engine can be initially started by said electric heating device which heats the fuel in the pipeline to a desired temperature before starting the engine, and after the fluid has become heated said electric heating device can be disconnected and the fuel temperature in the pipeline is maintained by heated fluid selectively passing through said fluid heating device heating device by the actions of said valve and constant temperature switch.

2. A heating device as defined in claim 1, wherein said electric heating device comprises a resistive wire placed about said fuel pipeline portion.

3. A heating device as defined in claim 1, wherein the fluid is engine liquid coolant and said fluid heating device comprises a liquid heat exchanger including a closed heating cylinder through which a length of the pipeline passes.

4. A heating device as defined in claim 3, wherein said length of pipeline is in the form of a helix.

5. A heating device as defined in claim 1, wherein the fluid is exhaust gas and said fluid heating device comprises a gas heat exchanger including a closed heating cylinder through which a length of pipeline passes.

* * * * *